United States Patent [19]

Beltran

[11] Patent Number: 4,612,548

[45] Date of Patent: Sep. 16, 1986

[54] MULTI-PORT RADIO FREQUENCY NETWORKS FOR AN ANTENNA ARRAY

[75] Inventor: Fernando Beltran, Wayland, Mass.

[73] Assignee: Raytheon Company, Lexington, Mass.

[21] Appl. No.: 785,035

[22] Filed: Oct. 8, 1985

Related U.S. Application Data

[62] Division of Ser. No. 616,449, Jun. 1, 1984, abandoned.

[51] Int. Cl.[4] .......................... H01Q 3/26; H04B 7/00

[52] U.S. Cl. ..................................... 343/373; 343/754

[58] Field of Search ............... 343/361, 367, 368, 371, 343/372, 373, 754

[56] References Cited

U.S. PATENT DOCUMENTS

| | | | |
|---|---|---|---|
| 3,277,489 | 10/1966 | Blaisdell | 333/125 X |
| 3,371,284 | 2/1968 | Engelbrecht . | |
| 3,490,054 | 1/1970 | Seidel | 333/109 |
| 3,729,692 | 4/1973 | Tanaka et al. | 333/1.1 |
| 3,731,217 | 5/1973 | Gerst et al. | 333/117 X |
| 3,833,866 | 9/1974 | Boutelant | 333/116 X |
| 3,979,754 | 9/1976 | Archer . | |
| 4,025,873 | 5/1977 | Chilluffo . | |
| 4,079,319 | 3/1978 | Bracke . | |
| 4,080,605 | 3/1978 | Hilton | 343/754 |
| 4,092,616 | 5/1978 | Osterwalder . | |
| 4,103,262 | 7/1978 | Woodward | 333/136 |
| 4,109,202 | 8/1978 | Kudsia et al. | 333/1.1 X |
| 4,206,464 | 6/1980 | Hirsch . | |
| 4,272,740 | 6/1981 | MacMaster et al. . | |
| 4,311,965 | 1/1982 | Jones . | |
| 4,311,966 | 1/1982 | Bert et al. . | |

FOREIGN PATENT DOCUMENTS

| | | | |
|---|---|---|---|
| 2612758 | 10/1977 | Fed. Rep. of Germany | 333/109 |

*Primary Examiner*—Eli Lieberman
*Attorney, Agent, or Firm*—Richard M. Sharkansky; Denis G. Maloney

[57] ABSTRACT

A network having a plurality of network ports includes a plurality of substantially identical, independent components, each one thereof having a plurality of ports, the degree of coupling among the ports of each component being characterized by a predetermined scattering coefficient matrix. A plurality of feed networks is included, each one having: a first port corresponding to one of the plurality of network ports; and, a plurality of second ports each one being coupled to a corresponding one of the plurality of ports of each one of the plurality of components, the degree of coupling among the first port and the plurality of second ports of each of the feed networks being characterized by a predetermined scattering coefficient matrix. The plurality of feed networks and the coupling thereof to the components characterize the network with a scattering coefficient matrix, relating the coupling among the network ports, different from the scattering coefficient matrix characterizing each one of the components. The plurality of feed networks and the coupling thereof to the components provide a pair of the network ports with a degree of coupling less than the degree of coupling between the pair of component ports coupled to said pair of network ports. The network may be a reciprocal network, such as a power divider/combiner, in either waveguide or strip transmission line, or a non-reciprocal network, such as a circular network.

2 Claims, 16 Drawing Figures

Fig.6D
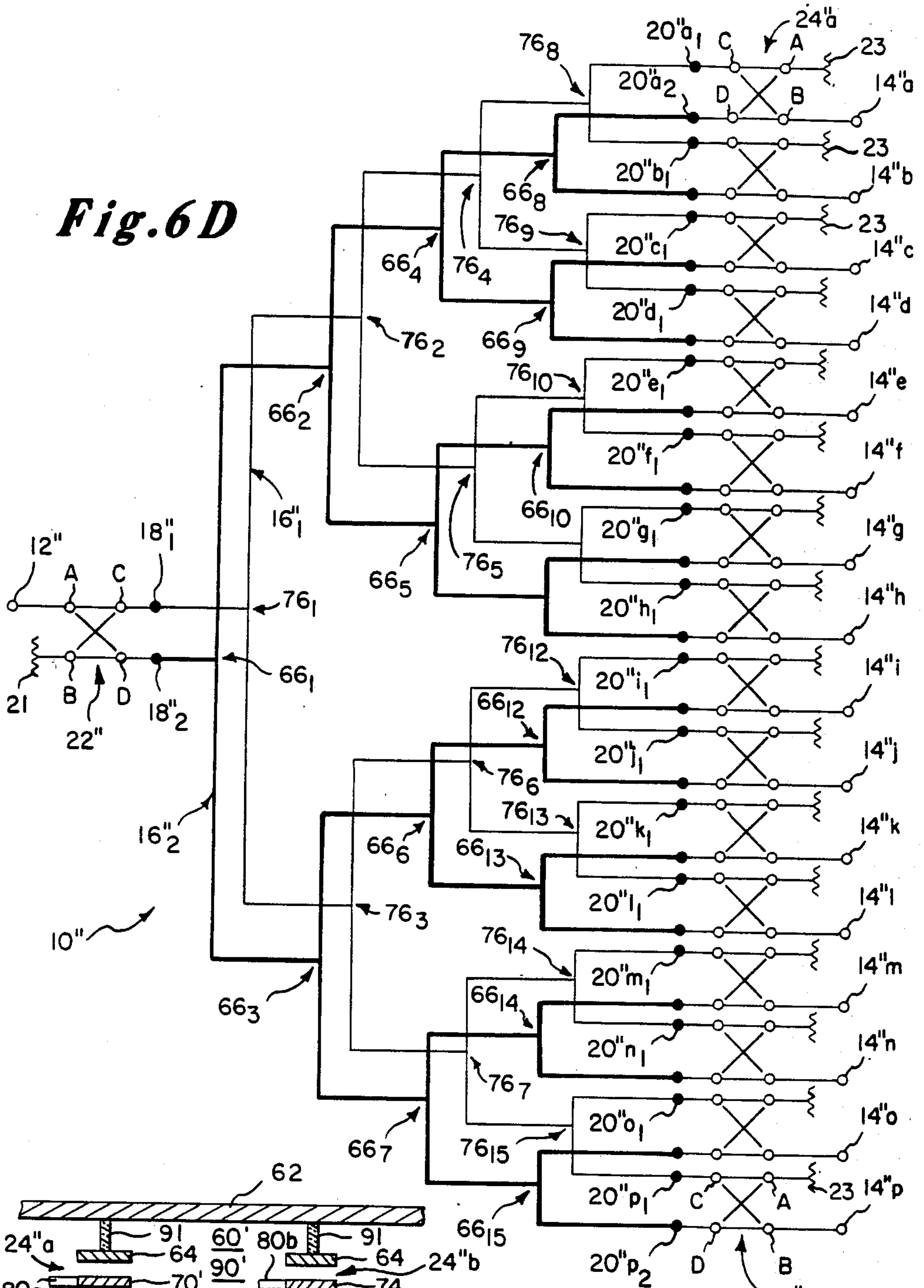
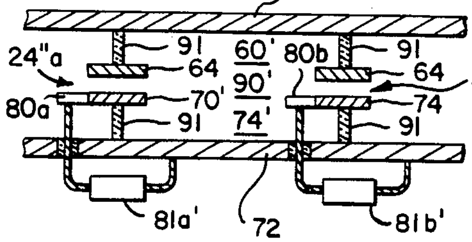
Fig.6E

MULTI-PORT RADIO FREQUENCY NETWORKS FOR AN ANTENNA ARRAY

This application is a divisional of application Ser. No. 616,449 filed June 1, 1984, now abandoned.

REFERENCE TO RELATED PATENT APPLICATION

The subject matter of the subject application is related to the subject matter of patent application entitled "Radio Frequency Power Divider/Combiner Networks", Ser. No. 616,451, filed by Richard L. O'Shea concurrently herewith and assigned to Raytheon Company.

BACKGROUND OF THE INVENTION

This invention relates generally to radio frequency networks and more particularly to multi-port radio frequency networks.

As is known in the art, multi-port radio frequency networks have a wide range of applications. In one such application, the network is used as a power divider/combiner for distributing radio frequency energy between a first port of the network and a plurality of second ports of the network. In an array antenna application of such power divider/combiner, an array of antenna elements is coupled to the plurality of second ports. Energy fed to the first port during transmission is coupled to the array of antenna elements and, reciprocally, energy received by the array antenna elements is combined at the first port. One such array antenna is a phased array antenna wherein a plurality of electrically controlled phase shifters is coupled between the plurality of second ports of the divider/combiner and the array antenna elements. Energy fed to, or combined at, the first port of the power divider/combiner is collimated into a beam, such beam being directed by the phase shift provided by the phase shifters, in response to electronic signals fed to the phase shifters. In another array antenna, a radio frequency lens is used as the power divider/combiner, such radio frequency lens having a plurality of first ports, each being associated with a corresponding one of a plurality of simultaneously produced, differently directed collimated beams of radio frequency energy. Each one of such beams is formed by a common aperture provided by an array of antenna elements coupled to a plurality of second ports of the lens. In either the phased array antenna or the lens array antenna, it is generally desired that the plurality of second ports have a relatively high degree of electrical isolation between each one thereof and, in the case of the lens array antenna, it is also generally desirable that the plurality of first ports also have a relatively high degree of electrical isolation between each one thereof. This isolation is desired to reduce the effect of reflections generated in one of the "isolated" ports from adversely effecting another one of the "isolated" ports. For example, in the phased array antenna, it is desirable that any energy reflected by one of the phase shifters not couple into another one of the phase shifters. In the lens array antenna, when such is configured to transmit a beam of radio frequency energy, an amplifier, such as a travelling wave tube amplifier, is generally coupled between each second port, and the antenna element coupled to such second port, and thus, if one of the amplifiers is defective, such may reflect energy back into the lens and such energy will then subsequently couple into an adjacent second port, thereby degrading performance of the antenna. Further, when the lens array is configured as a receiving array antenna, a radio frequency energy receiver is generally coupled to each one of the plurality of first ports of the lens. Energy received by the array of antenna elements is directed, or "focussed", to a receiver coupled to one of the first ports in accordance with the angle of arrival of such energy. However, some portion of the energy "focussed" to the receiver may be also reflected by the receiver. In the absence of a high degree of electrical isolation between the first ports, such reflected energy may couple into another receiver coupled to an adjacent one of the first ports thereby adversely affecting the performance of the antenna system.

In each of the above array antenna applications, the required electrical isolation has generally been provided by a single power divider/combiner component having the requisite port isolation. More particularly, in the phased array antenna application, one type of power/divider component having a relatively high degree of electrical isolation between output ports is a matched corporate feed such as that described in FIG. 38*a*, and Pages 11-52 to 11-53 of a book entitled *Radar Handbook*, Merrill I. Skolnik, Editor-In-Chief, published by McGraw Hill Book Company, New York, New York (1970). As described therein, the feed frequently includes a plurality of matched two-way dividers in which the "out-of-phase" components of mismatched reflections are absorbed in terminating loads. While such network provides the desired electrical isolation between the output ports thereof, when constructed as an integral corporate structure the terminating loads are disposed within the structure thereby increasing the fabrication complexity and hence, fabrication cost. Further, the two-way dividers are arranged in cascaded rows, the number of two-way dividers in the rows increasing binarily from row to row. Thus, if, for example, the feed is to feed sixteen antenna elements, four rows of dividers would be required and power fed from the input divider to each one of the sixteen antenna elements must pass through four serially, cascade coupled, dividers. Since energy passing into a divider experiences some loss, it follows that power losses in the feed increase directly with the number of antenna elements in the array.

SUMMARY OF THE INVENTION

In accordance with the present invention, a radio frequency network is provided for coupling radio frequency energy between at least one first network port and at least one pair of second network ports, such network comprising: a pair of like radio frequency energy components, each one having at least one first component port and at least one pair of second component ports electrically coupled to the at least one first component port, the at least one pair of second component ports of each of the pair of components having a degree of electrical isolation therebetween; first feed means for coupling energy between the at least one first network port and the at least one first component port of the pair of components; at least one pair of second feed means, a first one of the at least one pair of second feed means coupling energy between first like ones of the at least one pair of second component ports of the pair of components and a first one of the at least one pair of second network ports and a second one of at least one pair of second feed means coupling energy between second like ones of the at least one pair of second component ports of the pair of components and a second one of the at least one of the pair of second network ports; and, wherein the at least one first feed means and the at least one pair of second feed means couple the energy associated therewith to provide the at least one pair of second network ports with a degree of electrical isolation therebetween greater than the degree of electrical isolation between the at least one pair of second component ports of each of the pair of components.

In a preferred embodiment of the invention, the first feed means and the at least one pair of second feed means is a four port device, a first pair of such four ports being electrically coupled to a second pair of such four ports, the ports in each pair having a relatively high degree of electrical isolation therebetween. One of the first pair of ports of each four port device is terminated in a matched load and the other one of the first pair of ports provides a corresponding one of the network ports. The second pair of the four ports of each of the four port devices is coupled to a pair of like ports of the pair of components. The phase shift from a first one of the at least one pair of second network ports, through one of the pair of components, to a second one of the at least one pair of second network ports differs by $n\pi$ (where n is an odd integer) radians from the phase shift from the first one of the at least one pair of second network ports, through the other one of the pair of components, to the second one of the at least one pair of second network ports; however, the phase shift from a first one of the at least one first network ports, through one of the pair of components, to a first one of the at least one pair of second network ports differs by $n\pi$ (where n is an even integer) radians from the phase shift from such first one of the first network ports, through the second one of the pair of components, to such first one of at least one pair of second network ports. With such arrangement, while energy may be fed by reflection or otherwise into the first one of the at least one pair of second network ports and may then be coupled through the pair of components, the energy then emanating from the pair of components adds "in-phase" at, and is dissipated by, the load connected to the four port device coupled to the second one of the at least one pair of second network ports.

In a first preferred embodiment of the invention, the pair of components are power dividers/combiners. The first and second feed means have a pair of mutually isolated first feed ports coupled to a pair of mutually isolated second feed ports. One of the pair of first feed ports is terminated in a matched load and the other one of the pair of first feed ports is coupled to a corresponding one of the network ports. The pair of second feed ports is similarly coupled to a pair of like ports of the pair of components. With such arrangement, the at least one pair of the second network ports has a degree of electrical isolation (in decibels) equal to the sum of the degree of isolation (in decibels) between the at least one pair of second component ports coupled to said pair of second network ports and the degree of electrical isolation (in decibels) between the at least one pair of second feed ports of the feed means coupled to such pair of second component ports.

When such arrangement is used as a power divider/combiner network, the matched loads used in terminating each one of the first and second feed means are disposed externally of the components, thereby facilitating in fabrication of the network. Still further, the pair of components have a plurality of second component ports coupled to second network ports through a corresponding plurality of second feed means and the energy coupling between the first network port and any of the second network ports passes through only two matched load terminated feed means, regardless of the number of second network ports, thereby reducing the power loss of the network.

BRIEF DESCRIPTION OF THE DRAWINGS

The above mentioned aspects and other features of the invention are explained more fully in the following description taken in connection with the accompanying drawings in which:

FIGS. 6A, 6B, 6C, 6D and 6E are useful in understanding the radio frequency power divider/combiner of FIG. 3 in strip transmission line; FIG. 6A being a diagrammatical cross-section elevation view of the strip transmission line divider/combiner; FIG. 6B being a diagrammatical cross-sectional plane view of the strip transmission line divider/combiner; FIG. 6C being a diagrammatical cross-section elevation view of the combiner of FIG. 6B; the cross-section of FIG. 6A being along lines 6A—6A in FIG. 6B, the cross-section of FIG. 6C being along line 6C—6C of FIG. 6B and the cross-section of FIG. 6B being along lines 6B—6B in FIG. 6A; and, FIG. 6D being a schematic diagram of such strip transmission line divider/combiner; and FIG. 6E shows a portion of an alternative embodiment of the strip transmission line power divider/combiner using an air dielectric and externally mounted load;

DESCRIPTION OF THE PREFERRED EMBODIMENT

Figure 1:
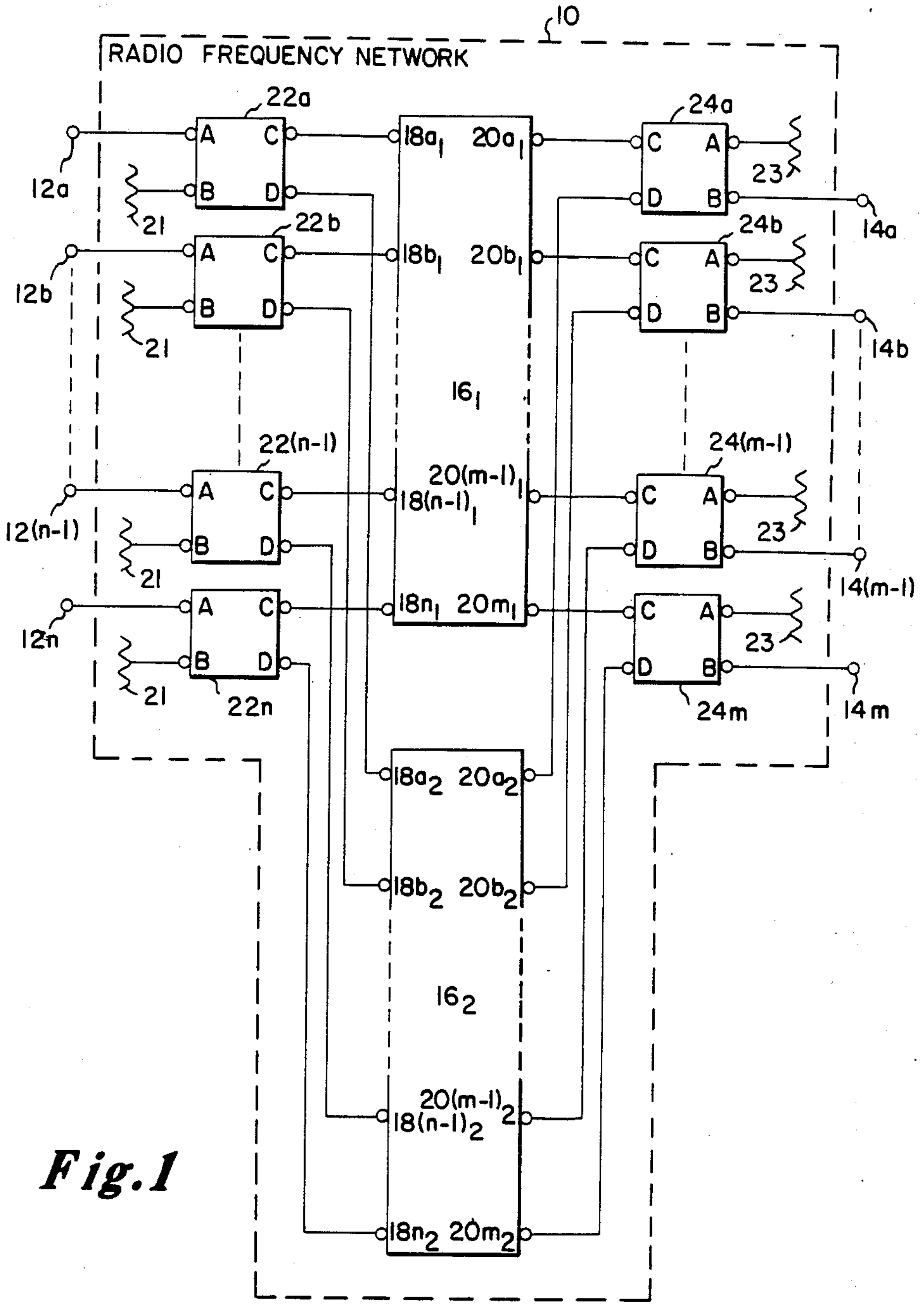
FIG. 1 is a block diagram of a radio frequency network according to the invention.

Referring now to FIG. 1, a multi-port radio frequency network 10 is shown for coupling radio frequency energy between a plurality of first network ports **12*a*-12*n* and a plurality of second network ports 14*a*-14*m*, the plurality of first network ports 12*a*-12*n* being substantially electrically isolated one from another and the plurality of second network ports 14*a*-14*m* being substantially electrically isolated one from another. The network 10** includes a pair of electrically independent radio frequency energy components $16_1$, $16_2$, each one having a plurality of first component ports $18a_1$–$18n_1$, $18a_2$–$18n_2$, respectively, as shown, and, a plurality of second component ports $20a_1$–$20m_1$, $20a_2$–$20m_2$, respectively, as shown. The components $16_1$, $16_2$, are substantially identical (i.e., like); that is, each one of such components $16_1$, $16_2$ has substantially the same scattering coefficients relating waves reflected and transmitted at the various ports; that is, the scattering coefficients relating ports $18a_1$–$18n_1$ and $20a_1$–$20m_1$ of component $16_1$ are substantially the same as those relating ports $18a_2$–$18n_2$ and $20a_2$–$20m_2$ of component 162. Thus, each one of the components $16_1$, $16_2$ may be characterized as having the same scattering matrix $S=[S_{ij}]$ where, as is well known, $S_{ii}$ is the reflection coefficient looking into port i, and $S_{ij}$ is the transmission coefficient from port j to port i, all other ports being terminated in matching impedances. While components $16_1$, $16_2$ have a relatively high degree of electrical coupling between the plurality of first component ports $18a_1$–$18n_1$, $18a_2$–$18n_2$, and the plurality of second component ports $20a_1$–$20m_1$, $20a_2$–$20m_2$, respectively, and while there is a relatively low degree of electrical coupling among the second component ports $20a_1$–$20m_1$, themselves, (or between ports $20a_2$–$20m_2$, themselves), and while there is a relatively low degree of electrical coupling among first component ports $18a_1$–$18n_1$ (or $18a_2$–$18n_2$) themselves, the degree of electrical isolation among the first network ports 12a–12n is substantially greater that the degree of electrical isolation among first component ports $18a_1$–$18n_1$ (or $18a_2$–$18n_2$) and the degree of electrical isolation among second network ports 14a–14m is substantially greater than the degree of electrical isolation among second component ports $20a_1$–$20n_1$ (or $20a_2$–$20m_2$).

Network 10 further includes a plurality of first feed networks 22a–22n and a plurality of second feed networks 24a–24m. Each one of the first feed networks 22a–22n is coupled between a corresponding one of the first network ports 12a–12n, as shown, and a pair of like ones of the first component ports $18a_1$–$18n_1$, $18a_2$–$18n_2$ of components $16_1$, $16_2$, respectively, as shown. Each one of the second feed networks 24a–24m is coupled between a pair of like ones of the second component ports $20a_1$–$20m_1$, $20a_2$–$20m_2$ of components $16_1$, $16_2$, respectively, and a corresponding one of the second network ports 14a–14m, as shown. Thus, network port 12a is coupled to like component ports $18a_1$, $18a_2$ through feed network 22a, port 12b is coupled to like component ports $18b_1$, $18b_2$ through feed network 22b, . . . and, port 12n is coupled to like component ports $18n_1$, $18n_2$ through feed network 22n, as shown; and, like component ports $20a_1$, $20a_2$ are coupled to second network port 14a through feed network 24a, like component ports $20b_1$, $20b_2$ are coupled to second network port 14b through feed network 24b, . . . and like component ports $20m_1$, $20m_2$ are coupled to second network port 14m through feed network 24m, as shown. The first feed networks 22a–22n and the second feed networks 24a–24m couple energy between the network ports 12a–12n and network ports 14a–14m through such feed networks 22a–22n, 24a–24m and through the pair of components $16_1$, $16_2$ to provide the first network ports 12a–12n with a degree of electrical isolation therebetween greater than the degree of electrical isolation between first component ports $18a_1$–$18n_1$ (or $18a_2$–$18n_2$) and to provide the second network ports 14a–14m with a degree of electrical isolation therebetween greater than second component ports $20a_1$–$20m_1$ (or $20a_2$–$20m_2$).

Feed networks 22a–22n, 24a–24m are each four-port networks; a first pair of ports A, B of each one of such networks being electrically coupled to a second pair of ports C, D; however, the ports A and B of the first pair are substantially electrically isolated from each other and the ports C and D of the second pair are substantially electrically isolated from each other and are matched when A, B are match-terminated. That is, the degree of electrical isolation between ports A, B and between ports C, D (when the other pair is match-terminated) is substantially greater than (i.e., by an order of magnitude) the degree of electrical isolation among the first component ports $18a_1$–$18n_1$ (or $18a_2$–$18n_2$) or among the second component ports $20a_1$–$20m_1$ (or $20a_2$–$20m_2$) (when all the ports are match-terminated). Here, each one of the feed networks 22a–22n, 24a–24m is a quadrature hybrid coupler. As is well known, with one of the ports A or B terminated in a matched load: (1) a signal applied to the unterminated one of the ports A or B will appear at ports C and D in phase "quadrature" (the signal at port D lagging in phase by 90 degrees with respect to the signal at port C if port B is terminated and the signal at port C lagging in phase 90 degrees with respect to port D if port A is terminated); (2) signals applied in phase "quadrature" to each other at ports C and D will appear "in phase" at port B and will cancel at port A when the signal at port D lags by 90 degree phase shift the signal at port C; and, (3) signals applied in phase "quadrature" to each other at ports C and D will add "in phase" at port A and will cancel at port B when the signal port C lags the signal at port D by 90 degrees phase shift. It is noted that ports B of first feed networks 22a–22n are terminated in a matched loads 21 and ports A of second feed network 24a–24n are terminated in matched loads 23. It is finally noted that with the feed networks 22a–22n, 24a–24m terminated in matched load impedances, 21, 23, respectively, the component ports $18a_1$–$18n_1$, $18a_2$–$18n_2$, $20a_1$–$20n_1$ and $20a_2$–$20n_2$ are thus terminated in matched loads (when looking into the feed networks).

Considering a radio frequency signal $E_a$ fed to one of the first network ports 12a–12n, say here, for example, network 12a, in response to such signal, first feed network 22a produces signals $E_a/\sqrt{2}$ and $jE_a/\sqrt{2}$ (when $j=\sqrt{-1}$) at ports C and D of such network 22a, respectively. The signal at port C of network 22a is fed to the first component port $18a_1$ of component $16_1$ and the signal at port D of feed 22a is fed to first component port $18a_2$ of component $16_2$, as shown. The signals fed to ports $18a_1$, $18a_2$ are distributed by the components $16_1$, $16_2$ in accordance with the scattering coefficients of the components $16_1$, $16_2$. Thus, if the scattering coefficients relating the voltages at second component ports $20a_1$–$20m_1$ (and $20a_2$–$20m_2$) to the voltage fed to port $18a_1$, (and $18a_2$) are: $S_{aa}$, $S_{ba}$, $S_{ca}$ . . . $S_{ma}$, respectively, then the voltages produced at second component ports $20a_1$–$20m_1$ of component $16_1$ may be represented as $(E_a/\sqrt{2})S_{aa}$, $(E_a/\sqrt{2})S_{ba}$, . . . $(E_a/\sqrt{2})S_{ma}$, respectively and the voltages at second ports $20a_2$–$20m_2$ of component $16_2$ may be represented as $(-jE_a/\sqrt{2})S_{aa}$, $(-jE_a/\sqrt{2})S_{ba}$, . . . $(-jE_a/\sqrt{2})S_{ma}$, respectively. It is noted that a pair of like ones of the second component ports $20a_1$–$20m_1$, $20a_2$–$20m_2$ (i.e., like pairs $20a_1$, $20a_2$; like pairs $20b_1$, $20b_2$; . . . like pairs $20m_1$, $20m_2$) is coupled to a corresponding one of the plurality of second feed networks 24a–24m. More particularly, second component ports $20a_1$–$20m_1$ are coupled to the C ports of second feed networks 24a–24m, respectively, as shown, and second component ports $20a_2$–$20m_2$ are coupled to the D ports of second feed network 24a–24m, respectively, as shown. Thus, since the voltages at terminals C and D of feed networks 24a–24m are equal in magnitude and since the phase of the signal at port D lags by 90 degrees the signal at port C, the resulting signals at network ports 14a–14m may be represented as: $(-jE_a)S_{aa}$; $(-jE_a)S_{ba}$; . . . $(-jE_a)S_{ma}$, respectively. Thus, in like manner, signals $E_b$ through $E_n$ fed to first network ports 12b through 12n, respectively, produce at ports 14a–14m signals $(-jE_b)S_{ab}$, $(-jE_b)S_{bb}$, . . . $(-jE_b)S_{mb}$ through $(-jE_n)S_{an}$, . . . $(-jE_n)S_{mn}$, respectively, as no energy is coupled to the loads 23. Thus, it has been shown that, in the general case, energy fed into the "A" port of the first feed networks 22a–22n is coupled to "B" ports of the second feed networks 24a–24m in accordance with scattering coefficients of the components $16_1$, $16_2$. As will now be described, however, the "A" ports of the first feed networks 22a–22n are substantially electrically isolated from each other independent of the scattering coefficients of the components $16_1$, $16_2$, and likewise, the "B" ports of the second feed networks 24a–24m are substantially electrically isolated from each other independent of the scattering coefficients of the components $16_1$, $16_2$. For example, considering next the effect of the network 10 on isolation between pairs of the first network ports 12a–12n or between pairs of the second network ports 14a–14m, say, for example, the effect of energy fed in to second network port 14a at second network port 14b. If the signal fed to port 14a is represented as $E_r$ the signals produced at ports C and D of second feed network 24a in response to $E_r$ may be represented as $(-jE_r/\sqrt{2})$ and $(E_r/\sqrt{2})$, respectively. If the components $16_1$, $16_2$ have a scattering coefficient $S'_{ba}$ relating the signal appearing at component port $20b_1$ (or $20b_2$) to the signal fed to ports $20a_1$ (or $20a_2$), it follows that the signals produced at ports $20b_1$, $20b_2$ in response to the signal $E_r$ at second network port 14a may be represented as: $(-jE_r/\sqrt{2})S'_{ba}$ and $(E_r/\sqrt{2})S'_{ba}$, respectively. The signals at ports $20b_1$, $20b_2$ are, as noted above, fed to ports C and D of second feed network 24b. Hence, it follows that, since the signals at ports C and D of network 24b are equal in magnitude with the phase of the signal at the C port lagging by 90 degrees the signal at the D port, the signals at the C and D ports of network 24b will add, in phase, at port A of such network 24a and hence the resulting energy will terminate in the load 23 connected to port A of network 24b and will cancel at port B of network 24b. That is, the phase of the signal passing from port 14a to port $20a_1$ to port $20b_1$ to port 14b differs by $n\pi$ (when n is an odd integer) from the phase of the signal passing from port 14a to port $20a_2$ to port $20b_2$ to port 14b. Thus, it follows that although there is a degree of electrical coupling between component ports $20a_1$ and $20b_1$, (and ports $20a_2$, $20b_2$) given by the scattering coefficient $S'_{ba}$, the second network ports 14a, 14b coupled to component ports $20a_1$, $20a_2$ and $20b_1$, $20b_2$ are substantially electrically isolated. In like manner, considering the isolation between an exemplary pair of first network ports 12a–12n, say between network port 12a and 12b, if energy $E'_r$ is fed to port 12a, signals $E'_r/\sqrt{2}$ and $-jE'_r/\sqrt{2}$ appear at ports C and D, respectively of feed network 22a. If the scattering coefficient between first component ports $18b_1$ and $18a_1$, (or $18b_2$ and $18a_2$) is $S''_{ba}$, the signals at ports $18b_1$ and $18b_2$ may be represented as $(E'_r/\sqrt{2})S''_{ba}$ and $(-jE'_r/\sqrt{2})S''_{ba}$, respectively. The signals at ports $18b_1$ and $18b_2$ are fed to ports C and D, respectively, of network 22b. Thus, since the signal at port D of network 22b lags by 90 degrees, the signal at port C of network 22b, the portion of the energy $E'_r$ at port 12a which has coupled to ports $18b_1$, $18b_2$ adds "in-phase" at the load 21 connected to port B of network 22b for dissipation by such load 21 and port 12a is thus electrically isolated from port 12b even though the component ports $18a_1$, $18b_1$ ($18a_2$, $18b_2$) are electrically coupled.

Figure 2:
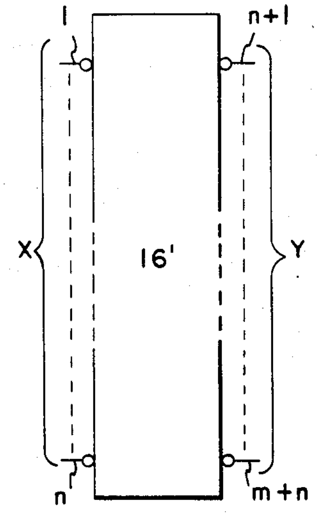
FIG. 2 is a block diagram of one of a pair of substantially identical components used in the network of FIG. 1.

Generalizing further on the description of FIG. 1, it is now evident that each one of the components $16_1$, $16_2$, may be considered as a multi-port network 16' (FIG. 2) having ports designated 1 through n as the plurality of first component ports $18a_1$–$18n_1$ (or $18a_2$–$18n_2$) and having ports designated (n+1) through (n+m) as the plurality of second component ports $20a_1$–$20n_1$ (or $20a_2$–$20n_2$). Thus, the scattering matrix [C] for the component 16' may be represented as:

$$[C] = \begin{bmatrix} S_{1,1} & S_{2,1} & S_{3,1} & \cdots S_{n,1} & S_{(n+1),1} & \cdots S_{n+m,1} \\ S_{1,2} & S_{2,2} & S_{3,2} & \cdots S_{n,2} & S_{(n+1),2} & \cdots S_{n+m,2} \\ S_{1,3} & S_{2,3} & S_{3,3} & \cdots S_{n,3} & S_{(n+1),3} & \cdots S_{n+m,3} \\ \cdot & \cdot & \cdot & \cdots & \cdot & \cdots \\ S_{1,n} & S_{2,n} & S_{3,n} & \cdots S_{n,n} & S_{(n+1),n} & \cdots S_{n+m,n} \\ S_{1,(n+1)} & S_{2,(n+1)} & S_{3,(n+1)} & \cdots S_{n,(n+1)} & S_{(n+1),n+1} & \cdots S_{n+m,(n+1)} \\ \cdot & \cdot & \cdot & \cdots & \cdot & \cdots \\ \cdot & \cdot & \cdot & \cdots & \cdot & \cdots \\ S_{1,n+m} & S_{2,n+m} & S_{3,n+m} & \cdots S_{n,n+m} & S_{(n+1),n+m} & \cdots S_{n+m,n+m} \end{bmatrix}$$

Equation (1) may be simplified as:

$$[C] = \begin{bmatrix} S_{X,X} & S_{Y,X} \\ S_{X,Y} & S_{Y,Y} \end{bmatrix} \quad (2)$$

where:

$$[S_{X,X}] = \begin{bmatrix} S_{1,1} & S_{2,1} & S_{3,1} & \cdots S_{n,1} \\ S_{1,2} & S_{2,2} & S_{3,2} & \cdots S_{n,2} \\ S_{1,3} & S_{2,3} & S_{3,3} & \cdots S_{n,3} \\ \cdot & \cdot & \cdot & \cdots \\ S_{1,n} & S_{2,n} & S_{3,n} & \cdots S_{n,n} \end{bmatrix} \quad (3)$$

$$[S_{Y,X}] = \begin{bmatrix} S_{(n+1),1} & \cdot & \cdot & \cdots S_{n+m,1} \\ S_{(n+1),2} & \cdot & \cdot & \cdots S_{n+m,2} \\ S_{(n+1),3} & \cdot & \cdot & \cdots S_{n+m,3} \\ \cdot & & & \cdots \\ S_{(n+1),n} & \cdot & \cdot & \cdots S_{n+m,n} \end{bmatrix} \quad (4)$$

$$[S_{X,Y}] = \begin{bmatrix} S_{1,(n+1)} & S_{2,(n+1)} & S_{3,(n+1)} & \cdots S_{n+m,(n+1)} \\ \cdot & & & \cdots \\ \cdot & \cdot & \cdot & \cdots \\ S_{1,n+m} & \cdot & \cdot & \cdots S_{n+m,(n+1)} \end{bmatrix} \quad (5)$$

$$[S_{Y,Y}] = \begin{bmatrix} S_{(n+1),(n+1)} & \cdot & \cdot & \cdots S_{n+m,(n+1)} \\ \cdot & \cdot & \cdot & \cdots \\ \cdot & \cdot & \cdot & \cdots \\ S_{(n+1),n+m} & \cdot & \cdot & \cdots S_{n+m,n+m} \end{bmatrix} \quad (6)$$

Thus, it is now evident that the effect of the plurality of first feed networks 22a–22n (FIG. 1) and the plurality of second feed networks **24*a*–24*m* (FIG. 1**), each having a scattering matrix [E] which may be represented as:

$$[F] = \begin{bmatrix} S_{A,A} \, S_{B,A} \\ S_{A,B} \, S_{B,B} \end{bmatrix} \tag{7}$$

$$\text{or, since } S_{A,A} = S_{B,B} = 1/\sqrt{2}$$

$$\text{and } S_{A,B} = S_{B,A} = -j/\sqrt{2}$$

$$[F] = \begin{bmatrix} 1/\sqrt{2} & -j/\sqrt{2} \\ -j\sqrt{2} & 1/\sqrt{2} \end{bmatrix}, \tag{8}$$

is to produce a network 10 (FIG. 1) with a scattering matrix [N] which may be represented as:

$$[N] = j \tag{9}$$

$$\begin{bmatrix} 0 & 0 & 0 & \ldots 0 & S_{(n+1),1} \ldots S_{n+m,1} \\ 0 & 0 & 0 & \ldots 0 & S_{(n+1),2} \ldots S_{n+m,2} \\ 0 & 0 & 0 & \ldots 0 & S_{(n+1),3} \ldots S_{n+m,3} \\ . & . & . & \ldots . & . \quad \ldots . \\ 0 & 0 & 0 & \ldots . & S_{(n+1)n} \ldots S_{n+m,n} \\ S_{1,(n+1)} & S_{2,(n+1)} & S_{3,(n+1)} & \ldots S_{n,(n+1)} & 0 \quad \ldots 0 \\ . & . & . & \ldots . & . \quad \ldots . \\ . & . & . & \ldots . & . \quad \ldots . \\ S_{1,n+m} & S_{2,n+m} & S_{3,n+m} & \ldots S_{n,n+m} & 0 \quad \ldots 0 \end{bmatrix}$$

It is noted that the scattering matrix [N] of network 10 in Equation (9) may be simplified to be represented as:

$$[N] = \begin{bmatrix} 0 & S_{Y,X} \\ S_{X,Y} & 0 \end{bmatrix} \tag{10}$$

Thus, it is now clear that since in the scattering matrix [N], $S_{X,X} = S_{Y,Y} = 0$, the effect of the first and second feed networks **22*a*–22*n*, 24*a*–24*m*, and the use of a pair of like components $\mathbf{16_1}$, $\mathbf{16_2}$ is to provide a network 10 with substantially electrical isolation between the networks first ports 12*a*–12*n* (i.e. $S_{XX}=0$) and between the network second ports 14*a*–14*m*** (i.e., $S_{YY}=0$) even though the components $\mathbf{16_1}$, $\mathbf{16_2}$ themselves have some coupling between their first component ports $\mathbf{18a_1}$–$\mathbf{18n_1}$ (or $\mathbf{18a_2}$–$\mathbf{18n_2}$) and some coupling between their second component ports $\mathbf{20a_1}$–$\mathbf{20m_1}$ (or $\mathbf{20a_2}$–$\mathbf{20m_2}$)

More accurately, while it has been assumed that the ports A and B (or C and D) have perfect isolation, any practical hybrid coupler has some finite isolation, typically in the order of 20 db isolation. Thus, the resulting isolation between pairs of the first or pairs of the second network ports will be 20 db plus the number of db isolation between pairs of the first component ports or pairs of the second component ports.

Figure 3:
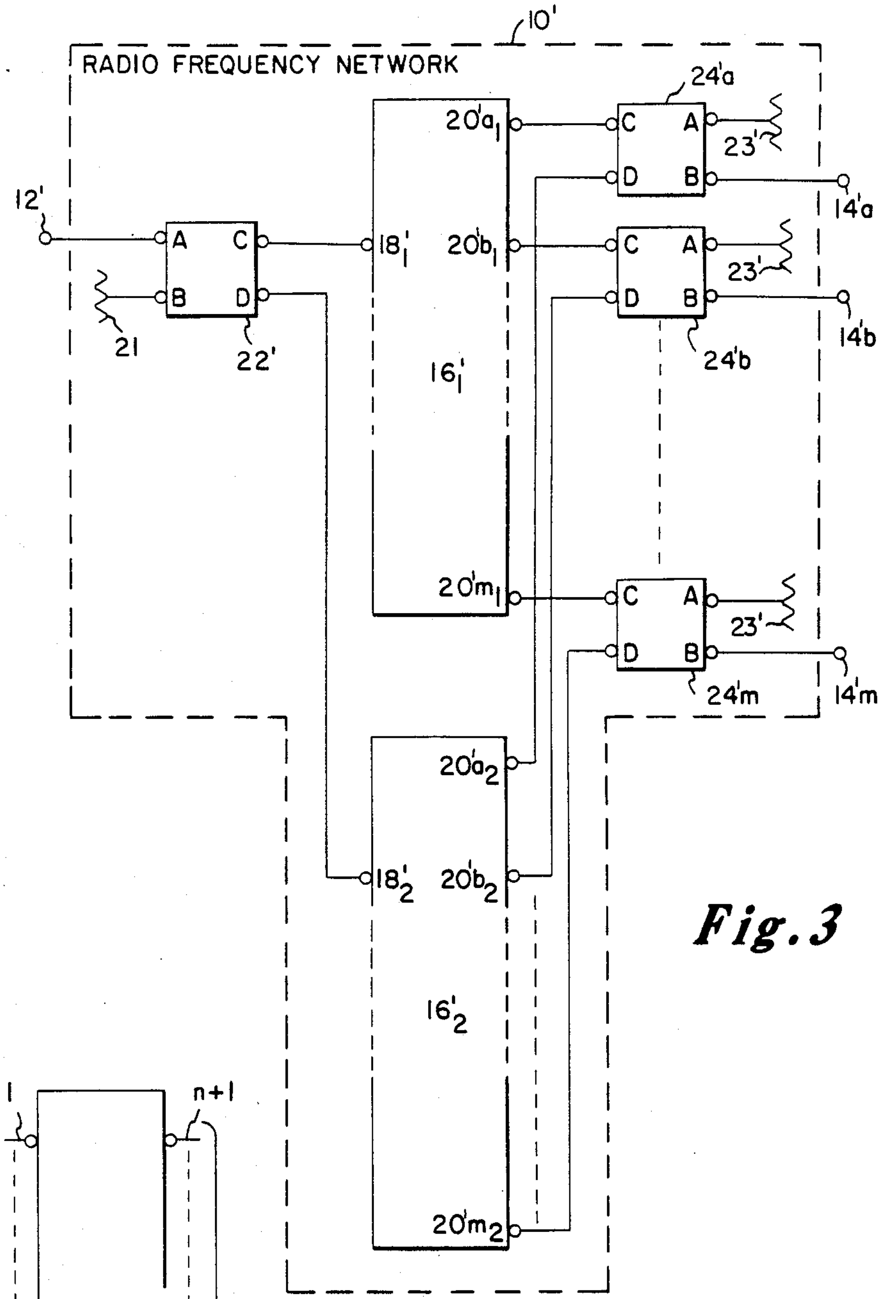
FIG. 3 is a block diagram of a radio frequency power divider/combiner according to the invention.

Referring now to FIG. 3, multi-port radio frequency 10' is shown as an m:1 power divider/combiner for coupling radio frequency energy between a single first network port 12' and a plurality of second network ports **14'*a*–14'*m*, the second network ports 14'*a*–14'*m* being substantially electrically isolated from each other. The network 10' includes a pair of substantially identical (i.e., like) electrically independent radio frequency energy components $\mathbf{16'_1}$, $\mathbf{16'_2}$ having a single first component ports $\mathbf{18'_1}$, $\mathbf{18'_2}$, respectively, as shown, and a plurality of second component ports $\mathbf{20'a_1}$–$\mathbf{20'm_1}$, $\mathbf{20'a_2}$–$\mathbf{20'm_2}$, respectively, as shown. While component $\mathbf{16'_1}$ (or $\mathbf{16'_2}$) has a relatively high degree of electrical coupling between first component port $\mathbf{18'_1}$ (or $\mathbf{18'_2}$) and the plurality of second component ports $\mathbf{20'a_1}$–$\mathbf{20'm_1}$ ($\mathbf{20'a_2}$–$\mathbf{20'm_2}$) and while there is a relatively low degree of electrical coupling among the second component ports $\mathbf{20'a_1}$–$\mathbf{20'm_1}$, (or $\mathbf{20'a_2}$–$\mathbf{20'm_2}$) themselves, the degree of electrical isolation among the second network ports 14'*a*–14'*m* is substantially greater than the degree of electrical isolation among the second component ports $\mathbf{20'a_1}$–$\mathbf{20'm_1}$ (or $\mathbf{20'a_2}$–$\mathbf{20'm_2}$). First feed network 22', here a quadrature hybrid coupler such as that described in connection with FIG. 1, is coupled between first network port 12' and first component ports $\mathbf{18'a_1}$, $\mathbf{18'a_2}$, while a plurality of second feed networks 24'*a*–24'*m*, here quadrature hybrid couplers, as described in FIG. 1, are coupled between pairs of like component ports $\mathbf{20'a_1}$, $\mathbf{20'a_2}$; $\mathbf{20'b_1}$, $\mathbf{20'b_2}$; . . . $\mathbf{20'm_1}$, $\mathbf{20'm_2}$ and seoond network ports 14'*a*–14'*m*, as shown. For reasons discussed in connection with FIG. 1, energy is coupled between port 12' and the plurality of second ports 14'*a*–14'*m*; however, the second network ports 14'*a*–14'*m* are substantially electrically isolated from each other. Further, the energy coupled between first network ports 12' and each one of the plurality of component ports 14'*a*–14'*m* passes through only two hybrid couplers regardless of the number of second network ports 14'*a*–14'*m***.

Thus, if energy $E_i$ is fed to network port 12', the energy at network ports **14'*a*–14'*m* may be represented as: $jS_{2,a}E_i$, $jS_{b,a}E_i$, . . . $jS_{n,a}E_i$, where $S_{a,a}$ is the scattering coefficient between component port $\mathbf{20'a_1}$ (or $\mathbf{20'a_2}$) and component port $\mathbf{18'_1}$, (or $\mathbf{18'_2}$); $S_{b,a}$ is the scattering coefficient between component port $\mathbf{20'b_1}$, (or $\mathbf{20'b_2}$) and component port $\mathbf{18'_1}$, (or $\mathbf{18'_2}$); . . . and, $S_{m,a}$ is the scattering coefficient between component port $\mathbf{20'm_1}$ (or $\mathbf{20'm_2}$) and component port $\mathbf{18'_1}$ (or $\mathbf{18'_2}$), respectively. Further, considering energy $E_r$ fed into component port 14'*a*, it is noted that while one portion of such energy $E_r$, here portion $-jE_r/\sqrt{2}$ is fed to component port $\mathbf{20'a_1}$ of component $\mathbf{16'_1}$, another portion of such energy $E_r$, here $E_r/\sqrt{2}$ is fed to component port $\mathbf{20'a_2}$ of component $\mathbf{16'_2}$. If the scattering coefficient between component port $\mathbf{20'b_1}$ and component port $\mathbf{20'a_1}$ of component $\mathbf{16'_1}$ is $S'_{ba}$ and the scattering coefficient between component port $\mathbf{20'b_2}$ and component port $\mathbf{20'a_2}$ of component $\mathbf{16'_2}$ is also $S'_{ba}$, the signals fed to ports C and D of feed network 24'*b* may be represented as: $-jE_rS'_{ba}/\sqrt{2}$ and $E_rS'_{ba}/\sqrt{2}$, respectively. Thus the signal at port A of feed 24'*b* is $-jE_rS'_{ba}$ and such signal is absorbed by matched load 23' connected to port A of network 24'*b*, and the signal at port B of network 24'*b*, and hence at network port 14'*b* is zero. Thus, the effect of the feed networks 22', 24'*a*–24'*m* and the pair of like components $\mathbf{16'_1}$, $\mathbf{16'_2}$ is to allow energy to pass between the first network port 12' and the plurality of second network ports 14'*a*–14'*m*; while the second ports 14'*a*–14'*m*** are isolated one from another even though there is some coupling between the second component ports $\mathbf{20'a_1}$–$\mathbf{20'm_l}$ (or $\mathbf{20'a_2}$–$\mathbf{20'm_2}$).

Figure 4A:
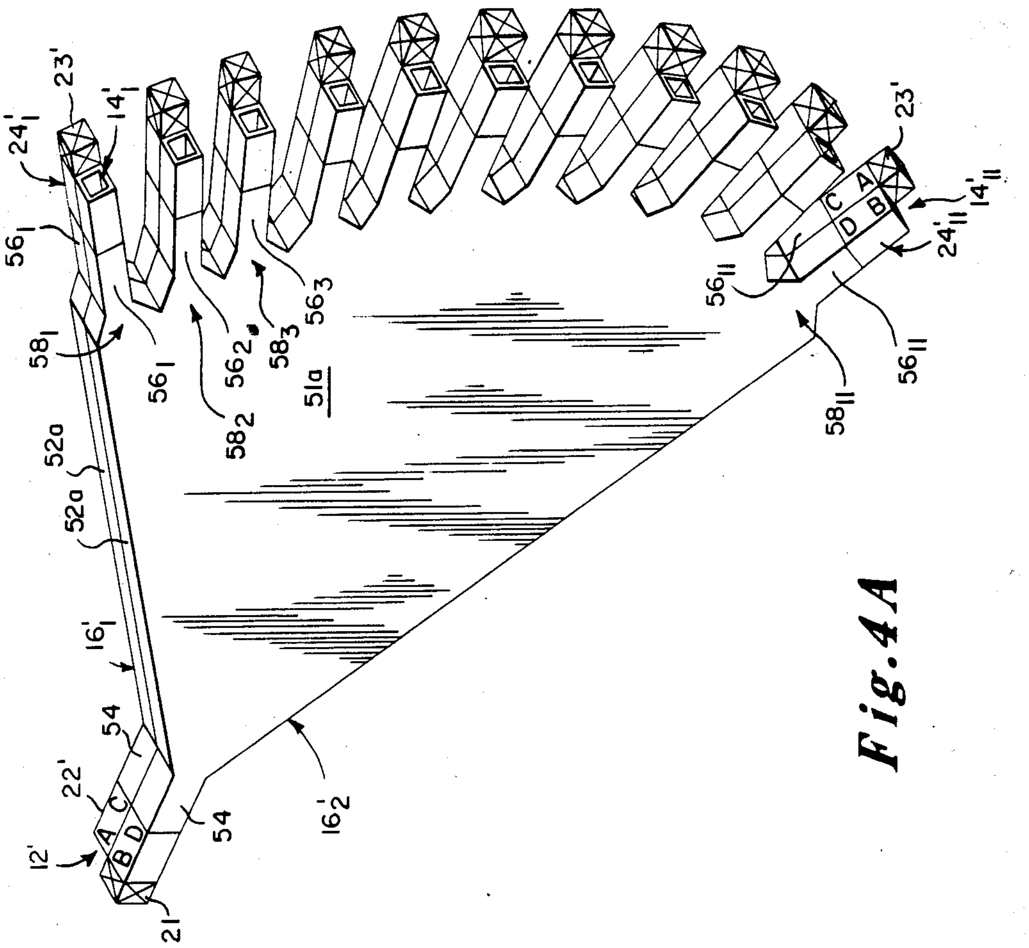
FIGS. 4A and 4B are schematic diagrammatical sketches of the radio frequency power divider/combiner of FIG. 3 in waveguide.
Figure 4B:
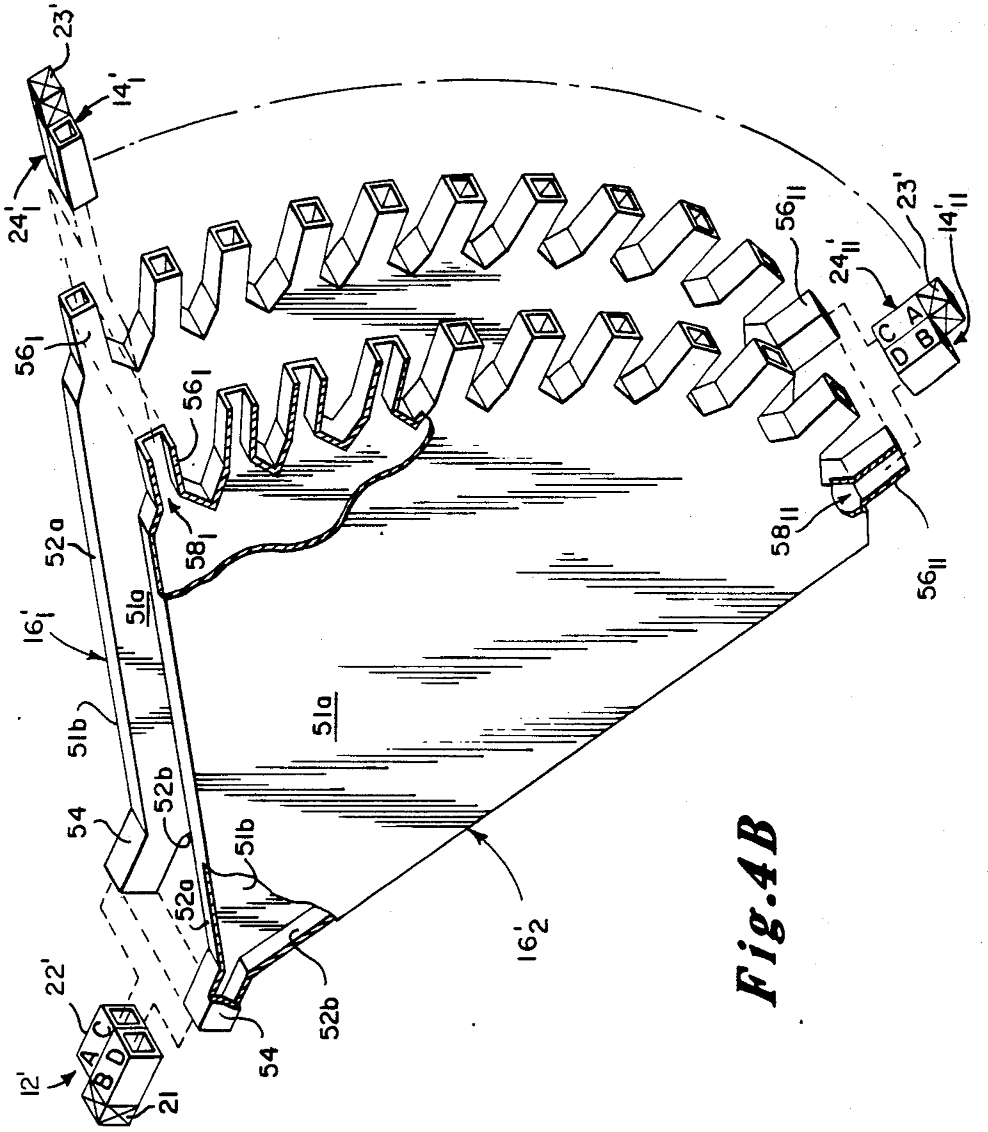
Figure 4C:
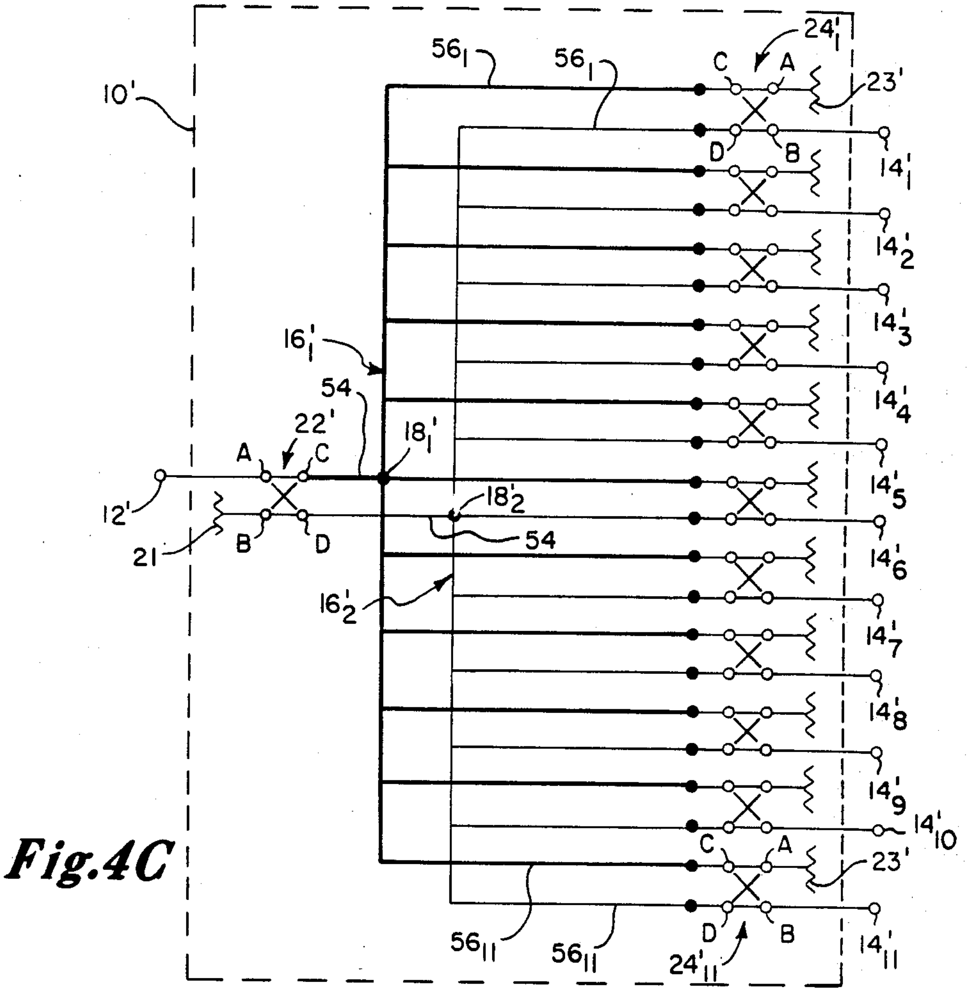
FIG. 4C is a schematic diagram of the power divider/combiner of FIGS. 4A and 4B.

Referring now to FIGS. 4A and 4B, the feed network 10' of FIG. 3 is shown implemented as a 11:1 sectorial divider/combiner. Here each one of the components $\mathbf{16_1'}$, $\mathbf{16_2'}$ of FIG. 3 is a conventional sectorial horn. Thus, each one of the sectorial horns $\mathbf{16'_1}$, $\mathbf{16'_2}$ has a pair of opposing triangular shaped, broad, side walls **51*a***, 51*b* and a pair of narrow walls 52*a*, 52*b*. At the apex of each sectorial horns $16'_1$, $16'_2$ is a rectangular waveguide section 54 and at the base of each of the horn is a plurality of, here 11, rectangular waveguide sections $56_1$–$56_{11}$. It is noted that between the base of each of the sectorial horns $16'_1$, $16'_2$ and the plurality of waveguide sections $56_1$, $56_{11}$ are tapered transition sections $58_1$–$58_{11}$ to provide some degree of electrical isolation between the plurality of waveguide sections $56_1$–$56_{11}$ and also to establish the $TE_{10}$ electromagnetic wave propagating mode to be coupled between the apex of each horn and each of the plurality of waveguide sections. The sectorial horns $16'_1$, $16'_2$ are mounted together in juxaposition fashion and have one side wall in common; here side wall 51*b* of horn $16'_2$ and side wall 51*a* of horn $16_1'$ are connected electrically and mechanically together; however, it is noted that the components $16'_1$, $16'_2$ are electrically independent of each other. The quadrature hybrid coupler 22' is connected to the waveguide sections 54 at the apexes of each of the horns $16'_1$, $16'_2$ and such may be considered as first feed network 22' in FIG. 3. Thus, waveguide 54 of horn $16'_1$ may be considered as port $18'_1$ of FIG. 3 and waveguide 54 of horn $16'_2$ may be considered as port $18'_2$. A load 21 is disposed in port B of such feed network 22' and ports C and D are connected to waveguide sections 54 of horns $16'_1$, $16'_2$, respectively, as shown. Thus, port A provides network port 12', as shown in FIG. 3. Quadrature hybrid couplers $24'_1$–$24'_{11}$ are coupled to the plurality of waveguide sections $56_1$–$56_{11}$, as shown, and thus may be considered as second feed networks $24'_a$–$24'_m$ in FIG. 3 (where here m is 11). It is noted that the C and D ports of couplers $24'_1$–$24'_{11}$ are coupled, as represented by the schematic block diagram in FIG. 3, to like pairs of the waveguide sections $56_1$–$56_{11}$. Thus, sections $56_1$–$56_{11}$ of horn $16'_1$ may be considered as second component ports $20'a_1$–$20'm_1$ (FIG. 3) and sections $56_1$–$56_{12}$ of horn $16'_2$ may be considered as second component ports $20'a_2$–$20'm_2$ of horn $16'_2$ (FIG. 3). Further, the matched loads 23' at ports A of the hybrids $24'_1$–$24'_{11}$ are shown in FIG. 4A (and schematically in FIG. 3). Thus, ports B of the hybrids $24'_1$–$24'_{11}$ provide 11 second network ports $14'_1$–$14'_{11}$, as shown schematically in FIG. 3 as ports $14'a$–$14'm$. A schematic diagram of feed network 10' is shown in FIG. 4C. It follows then that while there is some degree of electrical coupling between the waveguides $56_1$–$56_{11}$ of each of the horns $16'_1$, $16'_2$, the second network ports $14'_1$–$14'_{11}$ are substantially electrically isolated one from another. Further, the matched loads 23' are disposed external of the horns $16'_1$, $16'_2$. Still further, the energy fed to first port 12' to any one of the second ports $14'_1$–$14'_{11}$ passes through only two hybrid couplers.

Figure 5:
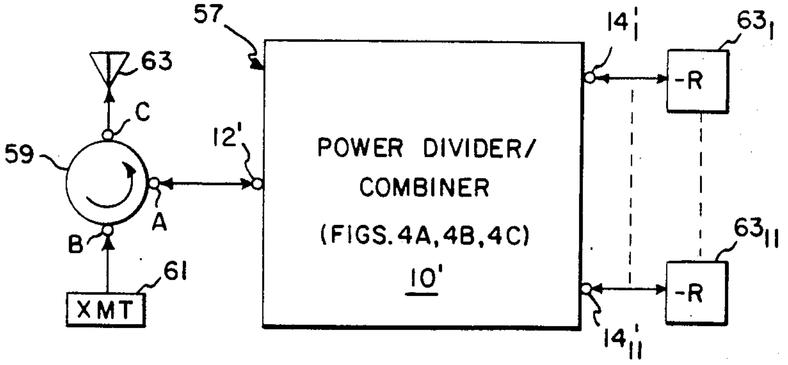
FIG. 5 is a schematic diagram of a microwave power combiner using the power divider/combiner of FIG. 3.

Referring now to FIG. 5, a microwave power combiner 57 is shown to include the power divider 10' described above in connection with FIGS. 4A, 4B and 4C. The first port 12' of such combiner 57 is coupled to port A of a conventional circulator 59, port B of such circulator 59 being fed by a transmitter 61 and port C of the circulator 59 being fed to antenna 63. The second ports $14_1'$ to $14_{11}'$ are coupled to negative resistance amplifiers $63_1$ to $63_{11}$, respectively, as shown. (It is noted that while 11 second ports have been shown for illustration, the number of second ports need not be restricted to eleven.) In operation, radio frequency energy fed to port B of circulator 59 from transmitter 61 is coupled to port A and thus through network 10' to the negative resistance (or reflection type) amplifiers $63_1$ to $63_{11}$ for amplification of such energy. After amplification, the energy is reflected back to port A and circulator 59 thus directs the amplified energy to port C and thus to antenna 63. It is noted that the amplifiers $63_1$ to $63_{11}$ have substantial electrical isolation therebetween for reasons set forth above in connection with FIGS. 4A to 4C.

Figures 6A, 6B, 6C:
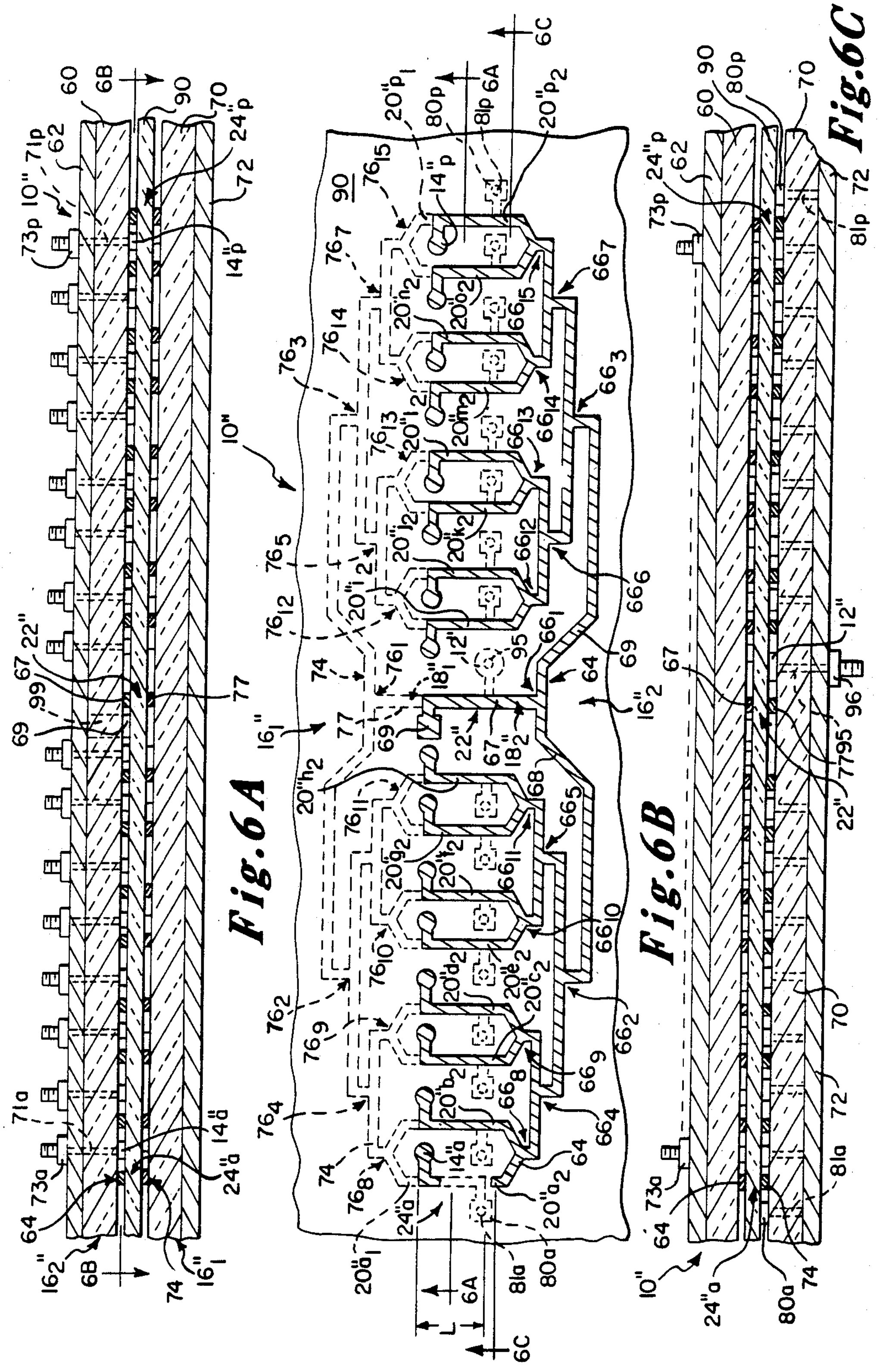

Referring now to FIGS. 6A, 6B and 6C, a 16:1 power divider/combiner 10" is shown, such combiner 10" being shown schematically in FIG. 6D. The power divider/combiner 10" includes a pair of substantially identical split-tee strip transmission line, electrically independent, power divider/combiner components $16''_1$, $16''_2$. The power divider/combiner 10" thus includes a pair of strip conductor circuitries 64, 74 separated from a pair of upper and lower ground plane conductors 62, 72 by a pair of upper and lower dielectric substrates 60, 70. The strip conductor circuitry 64 is formed on the upper surface of a relatively thinner dielectric substrate 90 and the strip conductor circuitry 74 is formed on the lower surface of the substrate 90 using conventional photolithographic-chemical etching techniques. The component $16''_1$ includes the strip conductor circuitry 74 and the portions of the substrates 60, 70, and the portions of ground plane conductors 62, 72, disposed above and below such strip conductor circuitry 74. The component $16''_2$ includes the strip conductor circuitry 64 and the portion of the substrates 60, 70, and the portions of ground plane conductors 62, 72, disposed above and below such strip conductor circuitry 64. Thus, referring to FIG. 6B, the component $16''_1$ is seen to be in the upper portion of FIG. 6B while the component $16''_2$ is seen to be in a different, non-overlapping region. More particularly, component $16''_2$ is seen to be in the lower portion of FIG. 6B. Thus, it is noted that the components $16''_1$, $16''_2$ are electrically isolated from each other, and each is a 16:1 split-tee strip transmission line component. The components $16''_1$, $16''_2$ have first component ports $18''_1$, $18''_2$, respectively, and a plurality of, here sixteen, second component ports $20''a_1$–$20''p_1$, $20''a_2$–$20''p_2$, respectively. The first component ports $18''_1$, $18''_2$ are coupled to first network port 12" through an overlay quadrature directional hybrid coupler 22" and pairs of like second component ports $20''a_1$, $20''a_2$ through $20''p_1$, $20''p_2$, are coupled to second network ports $14''a$–$14''p$ through overlay quadrature directional hybrid couplers $24''a$–$24''p$. More particularly, the strip on conductor 64 is patterned as a 16:1 split-tee network having 15 tee shaped sections $66_1$–$66_{15}$, as shown. The largest or first tee section $66_1$ thus has as its leg 67 the first component port $18''_2$ and splits into a pair of arms 68, 69. Arm 68 is coupled to the leg of tee $66_2$ and arm 69 is coupled to the leg of tee $66_3$. The arms of tee $66_2$ couple to the legs of tees $66_4$, $66_5$. The arms of tee $66_4$ are coupled to the legs of tee $66_8$, $66_9$ which thus form second component ports $20''a_2$, $20''b_2$, $20''c_2$ and $20''d_2$. The arms of tees $66_5$ are coupled to the legs of tees $66_{10}$, $66_{11}$, which thus form second component ports $20''e_2$, $20''f_2$, $20''g_2$ $20''h_2$. The arms of tee $66_6$ are coupled to the legs of tee $66_{12}$, $66_{13}$ which thus form second component ports $20''i_2$, $20''j_2$, $20''k_2$ and $20''l_2$. The arms of tee $66_7$ are coupled to the legs of tees $66_{14}$, $66_{15}$ and thus form second component ports $20''m_2$, $20''n_2$, $20''o_2$ and $20''p_2$. Thus, energy fed to leg 67 of tee $66_1$ will couple substantially equally to the second component ports $20''a_2$–$20''p_2$, and reciprocally, energy fed equally, and in-phase, to second component ports $20''a_2$–$20''p_2$ will combine, or add, in-phase at leg 67, i.e., at first component port $18''_2$. It is noted, however, that there is a relatively low degree of electrical isolation among the second component ports $20''a_2$-$20''p_2$, themselves. It is noted that the legs of tees $66_8$-$66_{15}$ extend vertically a predetermined length, then bend to the right at a 90 degree angle, and finally terminate in disc shaped regions of ports 14"a-14"p (the left leg of $66_8$ being shown partially broken away for clarity). As shown in FIG. 6A, these disc shaped regions are electrically connected to center conductors 71a-71p of conventionally coaxial connectors 73a-73p.

Referring next to component $16''_1$, it is first noted that such component $16''_1$ is, as far as the split-tee network portion, substantially identical to component $16''_2$. Thus, component $16''_1$ is also a stripline power divider/combiner and includes different portions of the dielectric substrates 60, 70 and different portions of the conductive ground plane conductors 62, 72 and a strip conductor circuit 74 formed on the lower surface of the substrate 90; thus, $16''_1$, $16''_2$ are substantially electrically independent. As noted above, the split tee network portion of strip conductor circuit 72 is substantially identical to that of circuit 62 and thus includes fifteen branch tees $76_1$-$76_{15}$ (i.e., tee-shaped sections), as shown. Thus, leg 77 of tee $76_1$ provides first component port $18''_1$ and energy fed to such tee $76_1$ passes to tees $76_2$, $76_3$, then to tees $76_4$, $76_5$, $76_6$, $76_7$ and then to tees $76_8$, $76_9$, $76_{10}$, $76_{11}$, $76_{12}$, $76_{13}$, $76_{14}$ and $76_{15}$. The arms of tees $76_8$-$76_{15}$ thus provide second component ports $20''a_1$-$20''p_1$, respectively. It is noted that the legs of tees $76_8$-$76_{15}$ extend vertically downward a predetermined length and then bend left at a 90 degree angle terminating in square conductive pads 80a-80p. Connected between these conductive pads 80a-80p and the ground plane conductor 72 are resistive loads 81a-81p (i.e., matched loads 23). These loads 81a-81p are inserted into apertures formed or drilled into the regions of the substrate 70 disposed below, the pads 80a-80p. It is noted that the major portions of the vertically downward extending legs of tees $76_8$-$76_{15}$ are disposed under (for a length L (FIG. 6B) substantially equal to $\lambda/4$, where $\lambda$ is the nominal operating wavelength of the combiner 10") and in registration with, the major portion of the vertically upward extending legs of tees $66_8$-$66_{15}$, respectively, as shown (the left leg of $66_8$ being shown partially broken away for clarity). It is noted, therefore, that the overlaying portions of the vertically extending legs of tees $76_8$-$76_{15}$ and $66_8$-$66_{15}$ together with the ground planes 62, 72 and dielectrics 60, 70, 90 form conventional stripline overlay quadrature directional hybrid couplers 24"a-24"p. Further, a portion of the leg 77 of tee $76_1$ underlies a portion of the leg 67 of tee $66_1$ to form, with ground planes 62, 72 and dielectrics 60, 70, 90 a conventional stripline overlay quadrature directional hybrid coupler (i.e., coupler 22"). Thus, a disc section coupled to arm 77 of tee $76_1$ provides the first network port 12" and is coupled to the center conductor 95 of a conventional coaxial connector 96, as shown. The upper vertical portion of leg 67 of tee $66_1$ bends 90 degrees to the left and terminates in a conductive pad 69. A resistive load 99 (FIG. 6A) (i.e., matched load 21) is connected between the ground plane conductor 62 and the conductive pad 69. This resistive load is inserted within a compartment formed, or drilled, in regions in the dielectric substrate 60 above pad 69. Thus, the overlaying portions of tees $66_1$ and $76_1$ are part of the first feed network 22". Thus, the underlying lower portion of leg 77 may be considered as port A of coupler 22"; the underlying upper portion of leg 77 may be considered as port C of the coupler 22" and is thus connected to first component port $18''_1$; the overlaying lower portion of leg 67 may be considered as port D of coupler 22" and is thus connected to first component port $18''_2$; and the overlying upper portion of leg 67 may be considered as port B of coupler 22" and is connected to load 21. Likewise, considering an exemplary one of the second feed network, say coupler 24"a, for example, the underlying upper portion of the left leg of tee $76_8$ may be considered as the C port of the coupler 24"a and the overlying lower portion of the left leg of tee $66_8$ may be considered as port D of coupler 24"a; the underlying lower portion of the left leg of tee $76_8$ may be considered as port A of the coupler 24"a and is thus connected to load 23; and the overlying upper portion of the left leg of tee $66_8$ may be considered as port B and is coupled to network port 14'a. With such arrangement, while there is relatively low isolation between the legs of tees $76_8$-$76_{15}$ and between the legs of tees $66_8$-$66_{15}$, these second network ports 20"a-20"p are substantially electrically isolated from each other. It is also noted that the power divider/combiner 10" is a reciprocal device and further it may be readily seen that this highly isolated structure requires that energy passing between any one of the second network ports 14"a-14"p and the first network port 12" passes through only two hybrid (directional) couplers. Thus, the power divider/combiner 10" is shown schematically as in FIG. 6D. It is here noted that while a stripline component is shown using dielectric substrates 60, 70, 90, such may be formed using an air dielectric 60', 70', 90' as shown diagrammatically in FIG. 6E where the ground planes 62, 72 are conductive sheets, or covers, and where the strip conductor circuitries 64, 74 are suspended in the air between these covers using dielectric pegs, struts, or posts 91, as shown in FIG. 6E. It is noted that here the resistive loads, as load 81a, are mounted externally. More particularly, as shown for an exemplary one of the pads 80a-80p, here pad 80a, a conductive feed through passes from pad 80a, through the air dielectric, through the conductive ground plane 72 to the load 81a; the other end of the load being connected to the ground plane 72, as shown. Thus while shown for load 81a, such external mounting may be used for loads 81b-81p, as well as load 99 (FIG. 6C).

Figure 7A:
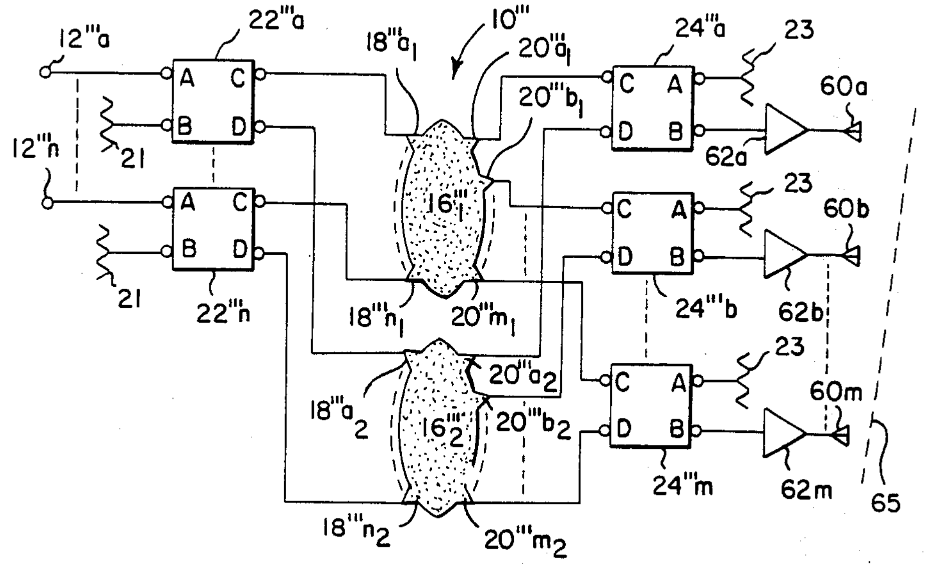
FIG. 7A shows a block diagram of a transmission multi-beam antenna system according to the invention.

Referring now to FIG. 7A, a radio frequency energy lens antenna system 10''' is shown to include a pair of electrically independent radio frequency lenses $16'''_1$, $16'''_2$, each one having a plurality of first, or beam ports $18'''a_1$-$18'''_1$, $18'''a_2$-$18'''n_2$, respectively, and a plurality of second, or array ports $20'''a_1$-$20'''m_1$, $20'''a_2$-$20'''m_2$, respectively, as shown. Each pair of like first, or beam ports of the pair of lenses is coupled, through a corresponding one of a plurality of first feed networks 22'''a-22'''n, to a corresponding one of a plurality of first, or beam, antenna system ports 12'''a-12'''n. Each one of the first feed networks 22'''a-22'''n is a quadrature hybrid coupler such as that described in connection with FIG. 1 and has the A port thereof coupled to a corresponding one of the first system ports 12'''a-12'''n, the B port coupled to a matched load 21, and C and D ports coupled to the pair of like first ports of the lenses $16'''_1$, $16'''_2$, as shown. Each one of the second feed networks 24'''a-24'''m is also a quadrature hybrid coupler such as that described in connection with FIG. 1 and has the A port coupled to a matched load 23, the B port coupled to a corresponding one of a plurality of antenna elements 60a-60m in an array thereof through, here a corresponding one of a plurality of TWT amplifiers 62a–62m, as shown. The C and D ports of each one of the second feed networks are coupled to a pair of like second ports of the lenses 16'''$_1$, 16'''$_2$, as shown. The electrical length from each one of the antenna elements 60a–60m to the pair of second, or array ports connected to such one of the elements 60a–60m, and the shape of the lenses 16'''$_1$, 16'''$_2$ are such that each one of the system ports 12'''a–12'''n is associated with a corresponding one of n differently directed, collimated beam of radio frequency energy, as described in U.S. Pat. No. 3,761,936, "Multi-Beam Array Antenna" inventors D. H. Archer, et al, issued Sept. 25, 1973 and assigned to the same assignee as the present invention; the electrical length from one point on the wavefront of one such beams, through one of the antenna elements 60a–60m, to the one of the system ports 12'''a–12'''n associated with such one of the beams is equal to the electrical length from another point on the same wavefront of such one of the beams, through another one of the antenna elements, to the same one of the system ports associated with such one of the beams. Thus, considering wavefront 65 as associated with system port 12'''a, the electrical length from one point on the wavefront 65 through antenna element 60a through ports 20'''a$_1$, 20'''a$_2$ of lenses 16'''$_1$, 16'''$_2$ to system port 12'''a is equal to the electrical length from another point of wavefront 65 through antenna element 60m through ports 20'''m$_1$, 20'''m$_2$ to system port 12'''a. It is noted, however, that reflections of energy ($E_r$) passing into port B of feed network 24'''a from amplifier 62a will appear as $-jE_r/\sqrt{2}$ at port C of network 24'''a and as $E_r/\sqrt{2}$ at port B of network 24'''a. The energy at ports C and D will couple to component ports 20'''b$_1$ and 20'''b$_2$. This energy, if coupled within the lenses 16'''$_1$, 16'''$_2$ to adjacent array ports, will emanate from ports 20'''b$_1$, 20'''b$_2$ as $-jKE/\sqrt{2}$ and $KE/\sqrt{2}$, respectively, when K is the scattering coefficient between ports 20'''a$_1$ and 20'''b$_1$ (or 20'''a$_2$ and 20'''b$_2$). The energy at ports 20'''b$_1$, 20'''b$_2$ will feed to the C and D ports of feed network 24'''b and will cancel at port B thereof but will add at port A thereof. Therefore, the reflected energy will be absorbed by the matched load 23 coupled to the port A of such feed network 24'''b and will not, therefore, enter amplifier 62b.

Figure 7B:
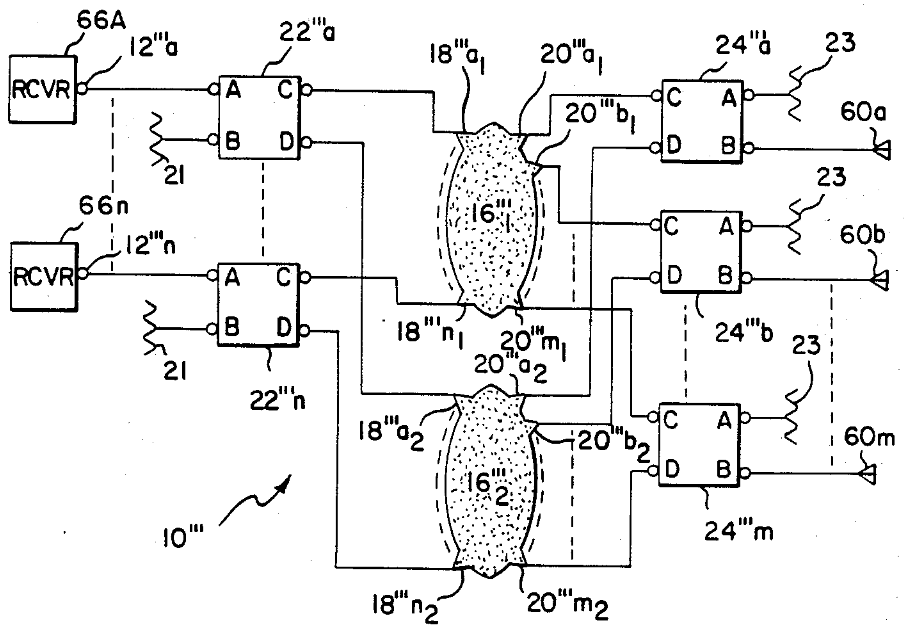
FIG. 7B shows a block diagram of a receiving multi-beam antenna system according to the invention.

It is noted that the array system at FIG. 7A, while shown as a transmitting system, may be configured as a receiving system as in FIG. 7B. Here the amplifiers 60a–60m of FIG. 7A are removed, but receivers 66a–66n are coupled to the first system ports 12'''a–12'''n, as shown. Any reflected portion of energy received at one of the receivers 66a–66n, say receiver 66a will cancel at the other first system ports 12'''b–12'''n, and will be absorbed by matched loads 21 coupled to the B ports of the feed network 22'''b–22'''n.

Figure 8:
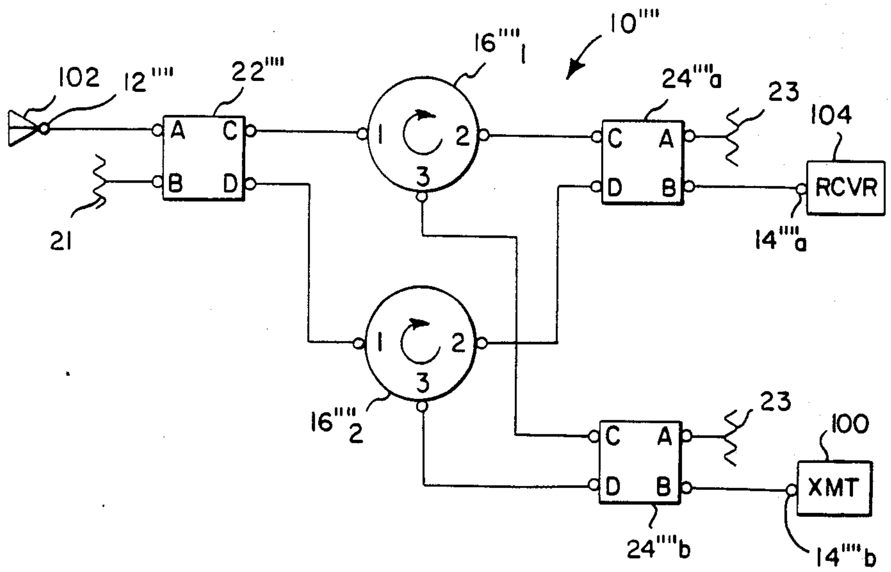
FIG. 8 shows a transmit/receive system including non-reciprocal radio frequency circulators, arranged in accordance with the invention; and, FIG. 9 shows a transmit-amplifier system using non-reciprocal radio frequency circulators, arranged according to the invention.

Referring now to FIG. 8, a radio frequency network 10'''' is shown for coupling energy from transmitter 100 to antenna element 102 during a transmission mode and for directing energy received by antenna element 102 to a receiver 104 during a receive mode. Here, the pair of electrically independent components 16''''$_1$, 16''''$_2$ are conventional 3-port circulators. Thus, each circulator: couples energy at port 1 non-reciprocally to port 2; couples energy at port 2 non-reciprocally to port 3; and, couples energy at port 3 non-reciprocally to port 1. Thus, the scattering matrix of each one of the circulators 16''''$_1$, 16''''$_2$ may be represented as:

$$\begin{bmatrix} S_{1,1} = 0 & S_{2,1} = 1 & S_{3,1} = 0 \\ S_{1,2} = 0 & S_{2,2} = 0 & S_{3,2} = 1 \\ S_{1,3} = 1 & S_{2,3} = 0 & S_{3,3} = 0 \end{bmatrix}$$

Ports of circulators 16''''$_1$, 16''''$_2$ are coupled to a first feed network 22'''', here a conventional quadrature hybrid coupler such as 22a in FIG. 1. Thus, the C and D ports of the hybrid 22'''' are coupled to the pair of ports 1 of the pair of circulators 16''''$_1$, 16''''$_2$, respectively, as shown; the B port of hybrid 22'''' is coupled to a matched load 21; and the A port is coupled to the antenna element 102, as shown at port 12''''. A pair of second feed networks 24''''a, 24''''b, here conventional quadrature hybrid couplers, are provided as shown. One of the pair of networks, here network 24''''a has the C and D ports coupled to the ports 2 of the pair of circulators 16''''$_1$, 16''''$_2$, respectively, as shown and the other one of the pair of networks, here network 24''''b, has the C and D ports thereof coupled to the ports 3 of circulators 16''''$_1$, 16''''$_2$, respectively, as shown. The A port of feed network 24''''a is coupled to matched load 23 and the B port is coupled to the receiver 104. The B port of feed network 24''''b is coupled to the transmitter 100 and the A port is coupled to matched load 23.

In operation, during transmission, energy $E_T$ from transmitter 100 is fed to port B of feed network 24''''b and appears at ports C and D of such network as $-jE_T/\sqrt{2}$ and $E_T/\sqrt{2}$, respectively. The energy then passes through ports 3 of the circulators 16''''$_1$, 16''''$_2$ to ports 1 thereof. Thus, the signals at ports C and D of feed network 22'''' may be represented as $-jE_T/\sqrt{2}$, $E_T/\sqrt{2}$, respectively. It follows then that the signal at the A port of feed network 22'''' and hence the signal fed to antenna element 102, may be represented as $-jE_T$. During the receive mode, the energy received by antenna element 102 may be represented as $E_r$. Thus, the signals at ports C and D of feed network 22'''' may be represented as $E_r/\sqrt{2}$ and $-jE_r/\sqrt{2}$, respectively, Since the energy at ports 1 of the circulators 16''''$_1$, 16''''$_2$ couple to ports 2 of the circulators, it follows that the signals at ports C and D of feed network 24''''a may be represented as $E_r/\sqrt{2}$ and $-jE_r/\sqrt{2}$, respectively. Thus, the signal at port B of the feed network 24''''a is $-jE_r$ and such energy is coupled to receiver 104. It is noted, however, that any energy reflected by the receiver 104, i.e., energy $E_r'$, appears at ports C and D of feed network 24''''a and may be represented at $-jE_r'/\sqrt{2}$ and $E_r'/\sqrt{2}$, respectively. These signals are fed to ports 2 of the pair of circulators 16''''$_1$, 16''''$_2$ and hence are coupled by the circulators to ports 3 thereof. Hence, it follows that the signals at ports C and D of feed network 24''''b may be represented as $-jE_r-/\sqrt{2}$ and $E_r'/\sqrt{2}$, respectively. Thus, these signals add "in phase" at port A of feed network 24''''b as $-jE_r'/\sqrt{2}$, and the energy in such signal is absorbed by the load 23 coupled to port A of such feed network 24''''b. Hence, while energy from port 2 of the pair of circulators is coupled to ports 3 of the circulators, energy reflected by receiver 104 at network port 14''''a (i.e., at port B of network 24''''a) is isolated from the transmitter at network port 14''''b (i.e., at port B of network 24''''b). Thus, the scattering matrix of network 10'''' may be represented as:

$$[N''''] = j \begin{bmatrix} S'_{1,1} = 0 & S'_{2,1} = 1 & S'_{3,1} = 0 \\ S'_{1,2} = 0 & S'_{2,2} = 0 & S'_{3,2} = 0 \\ S'_{1,3} = 1 & S'_{2,3} = 0 & S'_{3,3} = 0 \end{bmatrix}$$

where:

$S'_{1,1}$ = scattering coeff. at port 12'''' from port 12''''
$S'_{2,1}$ = scattering coeff. at port $14''''_a$ from port 12''''
$S'_{3,1}$ = scattering coeff. at port $14''''_b$ from port 12''''
$S'_{1,2}$ = scattering coeff. at port 12'''' from port $14''''_a$
$S'_{2,2}$ = scattering coeff. at port $14''''_a$ from port $14''''_a$
$S'_{3,2}$ = scattering coeff. at port $14''''_b$ from port $14''''_a$
$S'_{1,3}$ = scattering coeff. at port 12'''' from port $14''''_b$
$S'_{2,3}$ = scattering coeff. at port $14''''_a$ from port $14''''_b$
$S'_{3,3}$ = scattering coeff. at port $14''''_b$ from port $14''''_b$ Thus, $S_{3,2}$ of the circulators has, in effect, been made 0. It is further noted that while port 1 is coupled to both port 2 and port 3 (albeit non-reciprocally since energy received by the antenna 102 is fed to the receiver 104 and energy from the transmitter 100 is fed to the antenna element 102), ports **14''''*a* and 14''''*b* are isolated from each other even though energy at ports 2 of the circulators 16''''$_1$, 16''''$_2$ is coupled to port 3. Further, it is noted that during the transmit mode, the receiver 104 is electrically isolated from the transmitter 100 by the action of the circulator enhanced by the feed networks 24''''*a*, 24''''*b*, and their coupling to the circulators 16''''$_1$, 16''''**$_2$, as described.

Figure 9:
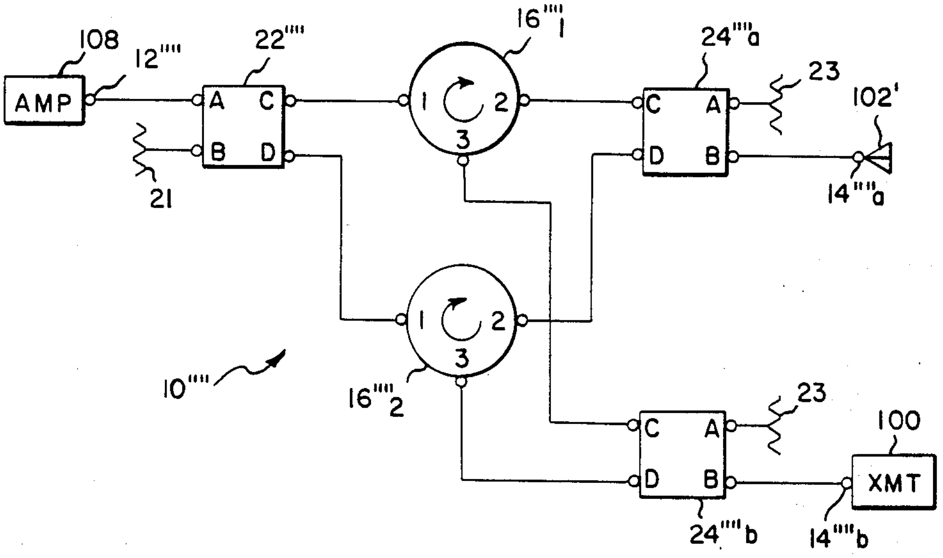

Referring now to FIG. 9, the receiver 104 of FIG. 7 has been replaced by an antenna element 102' and the antenna element 102 of FIG. 8 has been replaced an injection/reflection type amplifier/power combiner 108. Thus, here low level transmitted energy passes from transmitter 100 to the injection amplifier/combiner 108 for amplification therein and the amplified energy is then transmitted by the antenna element 102'. Thus, it is noted that while the amplifier/combiner 108 is coupled to the antenna element 102' after amplification and while the amplifier/combiner 108 is coupled to the transmitter 100 prior to amplification, energy reflected from the antenna element 102' is isolated from the transmitter 100 even though energy at ports 2 of the circulators 16''''$_1$, 16''''$_2$ is coupled to ports 3 of such circulators. Further, amplifier 108 is electrically isolated from reflections from, or power entering from, antenna 102'.

Having described a preferred embodiment of the invention, it is now evident that other embodiments incorporating these concepts may be used. It is felt, therefore, that this invention should not be restricted to the disclosed embodiment but rather should be limited only by the spirit and scope of the appended claims.

What is claimed is:

1. A multi-beam array antenna, adapted to form a plurality of n differently directed, collimated beams of radio frequency energy, each one of such beams being associated with a corresponding one of n system ports, comprising:

(a) an array of m antenna elements;

(b) a pair of substantially identical, electrically independent, radio frequency lenses, each one thereof having n beam ports and m array ports;

(c) a plurality of, n, first quadrature couplers, each one thereof having a first port coupled to a pair of substantially electrically isolated second ports;

(d) a plurality of, m, second quadrature couplers, each one thereof having a first port coupled to a corresponding one of the array of antenna elements and a pair of substantially electrically isolated second ports;

(e) means for coupling the n beam ports of a first one of the radio frequency lenses to first ones of the pair of second ports of the first quadrature couplers and for coupling the n beam ports of a second one of the pair of radio frequency lenses to second ones of the pair of second ports of the first quadrature couplers;

(f) means for coupling the m array ports of the first one of the radio frequency lenses to first ones of the pair of second ports of the second quadrature couplers and for coupling the m array ports of the second one of the pair of radio frequency lenses to second ones of the pair of second ports of the second quadrature couplers;

(g) wherein the electrical length from one point on the wavefront of one of the beams through one of the antenna elements and through the pair of radio frequency lenses to the one of the system ports associated with such one of the beams is equal to the electrical length from another point on said wavefront of said one of the beams through another one of the antenna elements and through the pair of radio frequency lenses to the same one of the system ports associated with such one of the beams; and, (h) wherein the phase shift between a first one of the antenna elements and a second one of the antenna elements through a first one of the pair of radio frequency lenses differs by $n\pi$ (where n is an odd integer) from the phase shift between said first one of the antenna elements to said second one of the antenna elements through the second one of the pair of radio frequency lenses.

2. The multi-beam array antenna recited in claim 1 wherein the phase shift between a first one of the system ports and a first one of the antenna elements through one of the pair of radio frequency lenses differs by $m\pi$ (where m is an even integer) from the phase shift between said first one of the system ports and said first one of the antenna elements through the second one of the pair of radio frequency lenses.

* * * * *